US011957959B2

(12) United States Patent
Stull

(10) Patent No.: US 11,957,959 B2
(45) Date of Patent: Apr. 16, 2024

(54) METHOD FOR EXERCISING HAND, WRIST, AND FOREARM USING STRETCHABLE THERAPEUTIC BRACELET

(71) Applicant: Jared Daniel Stull, Sylva, NC (US)

(72) Inventor: Jared Daniel Stull, Sylva, NC (US)

( * ) Notice: Subject to any disclaimer, the term of this patent is extended or adjusted under 35 U.S.C. 154(b) by 0 days.

(21) Appl. No.: 17/827,986

(22) Filed: May 30, 2022

(65) Prior Publication Data

US 2022/0288450 A1 Sep. 15, 2022

Related U.S. Application Data

(62) Division of application No. 16/507,014, filed on Jul. 9, 2019, now Pat. No. 11,344,768.

(Continued)

(51) Int. Cl.

*A63B 23/16* (2006.01)
*A61H 1/02* (2006.01)

(Continued)

(52) U.S. Cl.

CPC .......... *A63B 23/16* (2013.01); *A61H 1/0285* (2013.01); *A61H 1/0288* (2013.01);

(Continued)

(58) Field of Classification Search

CPC ........... A63B 2225/50; A63B 2220/51; A63B 2220/10; A63B 21/055; A63B 21/04; A63B 21/4017; A63B 21/4019; A63B 21/4021; A63B 21/4025; A63B 21/065; A63B 21/4034; A63B 21/4035; A63B 21/07; A63B 21/0414; A63B 21/0428; A63B 21/0435; A63B 21/0442; A63B 21/045; A63B 21/0455; A63B 21/0552;

(Continued)

(56) References Cited

U.S. PATENT DOCUMENTS 2,391,851 A * 12/1945 Willard ................ A63B 71/148 2/21
2,546,118 A * 3/1951 Wright ................... A45D 29/22 132/73

(Continued)

OTHER PUBLICATIONS

Youtube search (Year: 2023).*
Myofascial Release How it relieves pain_cleveland clinic (Year: 2023).*

*Primary Examiner* — Megan Anderson
(74) *Attorney, Agent, or Firm* — Charlotte C. Wilson

(57) ABSTRACT

A therapeutic bracelet includes a strip of elastomeric material that defines an interior surface, an exterior surface, and a plurality of finger holes extending through the strip. The strip of elastomeric material is configured to be positioned over an operative hand of a user and to be worn around a wrist of the user. Upon periodic removal of the therapeutic bracelet from the wrist, the user inserts one or more digits in the finger holes from the interior surface and stretches the therapeutic bracelet with a thumb of the operative hand or with an opposite hand. A method of using the therapeutic bracelet to alternately strengthen and stretch the operative hand is also provided. The bracelet may also be used for supporting the wrist in an ergonomically correct position; and, when turned inside out, for massaging sore or injured muscles.

19 Claims, 7 Drawing Sheets

Related U.S. Application Data

(60) Provisional application No. 62/695,582, filed on Jul. 9, 2018.

(51) Int. Cl.
*A63B 21/04* (2006.01)
*A63B 21/055* (2006.01)
*A63B 23/14* (2006.01)

(52) U.S. Cl.
CPC ............ *A63B 21/055* (2013.01); *A63B 23/14* (2013.01); *A63B 21/04* (2013.01)

(58) Field of Classification Search
CPC ............ A63B 21/0555; A63B 21/0557; A63B 21/00061; A63B 23/14; A63B 23/16; A63B 2225/20; A44C 5/0015; A61H 1/0285; A61H 1/0288; A61H 7/001; A61H 2201/1253; A61H 2201/1695; A61H 2201/5046; A61H 2201/5058; A61H 2201/5061
USPC ............................................................ 482/44
See application file for complete search history.

(56) References Cited

U.S. PATENT DOCUMENTS 2,641,074 A * 6/1953 Richmond ............. G09F 3/005 63/3
2,807,928 A * 10/1957 Wills ...................... A44C 5/02 59/80
2,846,796 A * 8/1958 Polzin ..................... G09F 3/005 40/633
2,871,592 A * 2/1959 Polzin ..................... G09F 3/005 24/574.1
2,911,743 A * 11/1959 Pokras .................... G09F 3/005 40/633
3,020,658 A * 2/1962 Clark ...................... G09F 3/005 40/633
3,157,941 A * 11/1964 White ..................... G09F 3/005 29/241
3,238,939 A * 3/1966 Stubbs .................. A61F 13/108 473/213
3,501,773 A * 3/1970 Stansberry ........... A63B 71/148 473/59
3,612,521 A * 10/1971 Wendeborn ............ A63B 23/16 D24/214
3,656,247 A * 4/1972 Bushnell ................. G09F 3/005 40/633
4,037,442 A * 7/1977 Staude ................. A45C 11/324 70/456 R
4,176,839 A * 12/1979 Pinkus ................... A63B 69/38 473/213
4,323,232 A * 4/1982 Terpening ............. A63B 69/38 473/409
4,368,883 A * 1/1983 Tiktin ................ A63B 21/4021 2/163
4,679,799 A * 7/1987 Coletti ................... A63B 65/00 473/505
4,828,249 A * 5/1989 Keating ................. A63B 23/16 482/121
4,977,621 A * 12/1990 Richard ............... A41D 13/082 2/161.3
5,005,824 A * 4/1991 Eichel .................... A63B 23/16 482/44
5,062,625 A * 11/1991 Vonk .................. A63B 21/4019 482/48
5,298,001 A * 3/1994 Goodson ............ A63B 21/4019 2/161.1
D348,090 S * 6/1994 Riley, Jr. ................... D29/116.1
5,338,290 A * 8/1994 Aboud .................. A61F 15/006 602/62
5,366,436 A * 11/1994 Gibney ................ A63B 21/055 482/121
5,383,827 A * 1/1995 Stern ................ A63B 21/00178 482/44
5,445,582 A * 8/1995 Brown ............... A63B 21/4025 601/40
D370,510 S * 6/1996 Kissin .......................... D21/683
5,657,645 A * 8/1997 Abraham ............. A44C 5/0053 63/3
5,667,466 A * 9/1997 Riley, Jr. .............. A63B 21/065 482/79
5,704,883 A * 1/1998 Eckmann ............. A63B 21/065 482/139
5,898,938 A * 5/1999 Baylor ................. A63B 71/143 2/161.1
5,924,136 A * 7/1999 Ogean .................. A45C 11/182 2/163
6,119,267 A * 9/2000 Pozzi ................... A41D 13/088 2/161.1
6,179,751 B1 * 1/2001 Clears ................ A63B 21/4019 482/44
6,224,513 B1 5/2001 Chow
6,228,001 B1 * 5/2001 Johnson ............... A63B 21/028 482/44
6,309,270 B1 * 10/2001 Harwell, IV ........... A63B 33/00 441/55
D450,795 S * 11/2001 Riley, Jr. ...................... D21/683
6,513,685 B1 * 2/2003 Tzoubris ................ A44C 19/00 223/111
D488,843 S * 4/2004 Brown ......................... D21/684
6,817,967 B1 * 11/2004 Ott ..................... A63B 21/4019 482/47
7,288,051 B1 * 10/2007 Phillips ............. A63B 21/4039 482/45
7,731,633 B1 * 6/2010 Williams ........... A63B 21/4025 482/148
8,118,719 B1 * 2/2012 Stassi ................ A63B 21/0555 482/44
D665,090 S * 8/2012 Tucker ......................... D24/214
8,343,015 B2 1/2013 Zachary
D690,781 S * 10/2013 Uchytil ........................ D21/694
9,005,084 B2 4/2015 Silagy et al.
9,028,371 B2 * 5/2015 Trent ............... A63B 21/00189 482/121
9,387,109 B2 * 7/2016 Keoshian .............. A61F 5/0118
9,643,073 B1 * 5/2017 Pellegrino ............ A63B 71/141
D858,661 S * 9/2019 Wang ........................... D21/684
D863,464 S * 10/2019 Rhodes ...................... D29/117.1
11,344,768 B1 * 5/2022 Stull .................... A63B 21/055
2002/0065172 A1 5/2002 Kasun
2002/0175894 A1 * 11/2002 Grillo ...................... G06F 3/014 345/156
2003/0087729 A1 * 5/2003 Kasun ................ A63B 21/4019 482/124
2003/0093015 A1 * 5/2003 Lo ...................... A63B 21/0552 601/84
2003/0199364 A1 * 10/2003 Mah .................. A63B 21/4019 482/23
2005/0186865 A1 * 8/2005 Harwell ................. A63B 31/02 441/57
2006/0247102 A1 * 11/2006 Kupferman ........ A63B 21/0552 482/44
2007/0030128 A1 * 2/2007 Hills ...................... A63B 71/06 340/323 R
2007/0129216 A1 * 6/2007 Ott ....................... A63B 21/055 482/47
2007/0254780 A1 * 11/2007 Findeisen .............. A63B 23/16 482/44
2008/0060116 A1 * 3/2008 Massage .............. A44C 5/0023 2/170
2008/0081746 A1 * 4/2008 Woodruff ........... A63B 21/0552 482/121
2008/0096726 A1 * 4/2008 Riley .................... A61B 5/1118 482/8
2008/0276341 A1 * 11/2008 Duby ............... A41D 19/01582 2/163

(56) References Cited

U.S. PATENT DOCUMENTS

2009/0059734 A1* 3/2009 Burton .................. G04G 17/08 368/294
2009/0156367 A1* 6/2009 Harris, Jr. ........... A63B 21/055 482/49
2010/0037413 A1* 2/2010 Tyler ..................... A61H 35/00 15/244.4
2011/0277501 A1* 11/2011 Davis .................. A44C 5/0053 63/1.13
2011/0281688 A1* 11/2011 Harris, Jr. ............. A63B 23/16 482/44
2012/0201104 A1 8/2012 Amenduni Gresele
2012/0283049 A1* 11/2012 Grover .............. A63B 69/0059 473/422
2013/0019376 A1* 1/2013 Gaston .................. A41D 13/08 2/69
2013/0020367 A1* 1/2013 Buckley .............. A63B 57/207 224/183
2013/0184123 A1* 7/2013 McLoughney ........ A63B 21/22 482/8
2013/0227755 A1* 9/2013 Bisaillon ........... A41D 19/0048 2/161.1
2013/0281234 A1* 10/2013 Ramirez .................. A41F 1/06 2/161.1
2014/0014693 A1* 1/2014 Korotkina ........... A63B 57/353 224/267
2014/0174124 A1* 6/2014 Duggal ............... A44C 5/0015 63/5.1
2014/0174958 A1* 6/2014 Martinez ................ G06F 15/00 224/257
2014/0257537 A1* 9/2014 Stroupe ............ H04M 1/72409 700/91
2015/0202514 A1* 7/2015 Ervin ................ A63B 69/0059 473/450
2015/0202521 A1* 7/2015 Abdelmalek .... A41D 19/01523 2/20
2016/0022528 A1* 1/2016 Wyatt ................... A61H 1/008 601/152
2016/0243426 A1* 8/2016 Griffin .............. A63B 69/0075
2016/0250511 A1* 9/2016 Nolan ............... A63B 21/0726 482/108
2016/0256741 A1* 9/2016 Holma .................. A61B 5/681
2016/0353846 A1* 12/2016 Zanghi ................ A44C 5/0053
2017/0056713 A1* 3/2017 Abdourazak .......... A63B 23/14
2017/0086519 A1* 3/2017 Vigano' .............. A63B 71/141
2017/0216671 A1* 8/2017 Wisbey ............. A61B 5/02438
2017/0304557 A1* 10/2017 Chettiar ............... A61M 5/158
2017/0347727 A1* 12/2017 Bailey ................. A63B 71/143
2017/0348584 A1* 12/2017 Rhodes ................. A63B 71/14
2018/0020193 A1* 1/2018 Blum .................. G03B 17/561
2018/0093127 A1* 4/2018 Hinduja ............ A63B 21/4025
2018/0099200 A1* 4/2018 Young ............... A63B 69/0059
2018/0140929 A1* 5/2018 Pellegrino ........... A63B 71/141
2018/0214342 A1* 8/2018 Harrison ........... A63B 21/4023
2018/0214742 A1* 8/2018 Harrison ........... A63B 21/4017
2019/0015017 A1* 1/2019 Sano ...................... A61B 5/681
2019/0168071 A1* 6/2019 Franks ................ A61B 5/1072
2019/0343205 A1* 11/2019 Clausen ................ A61B 5/021

* cited by examiner

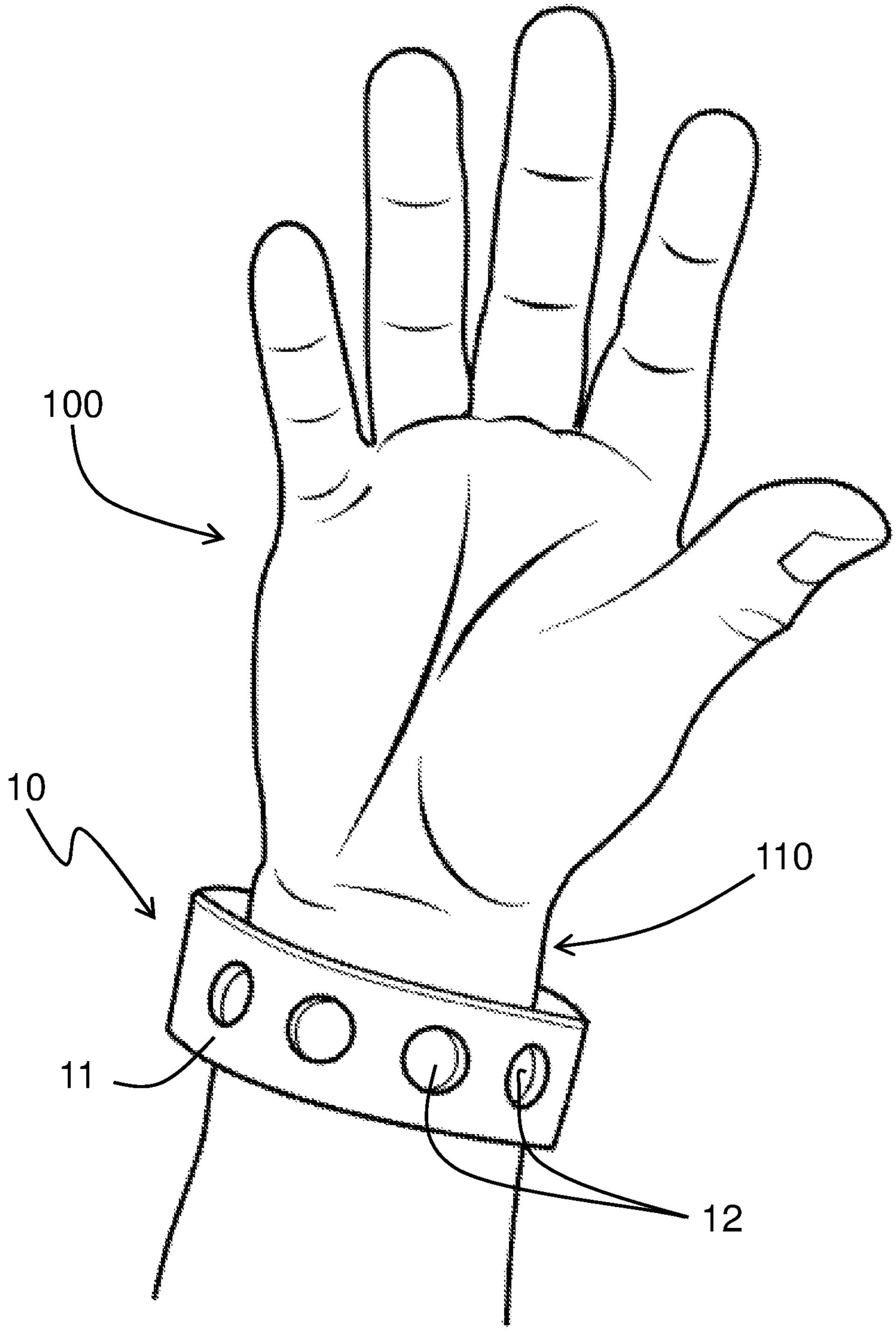
— FIG. 1 —

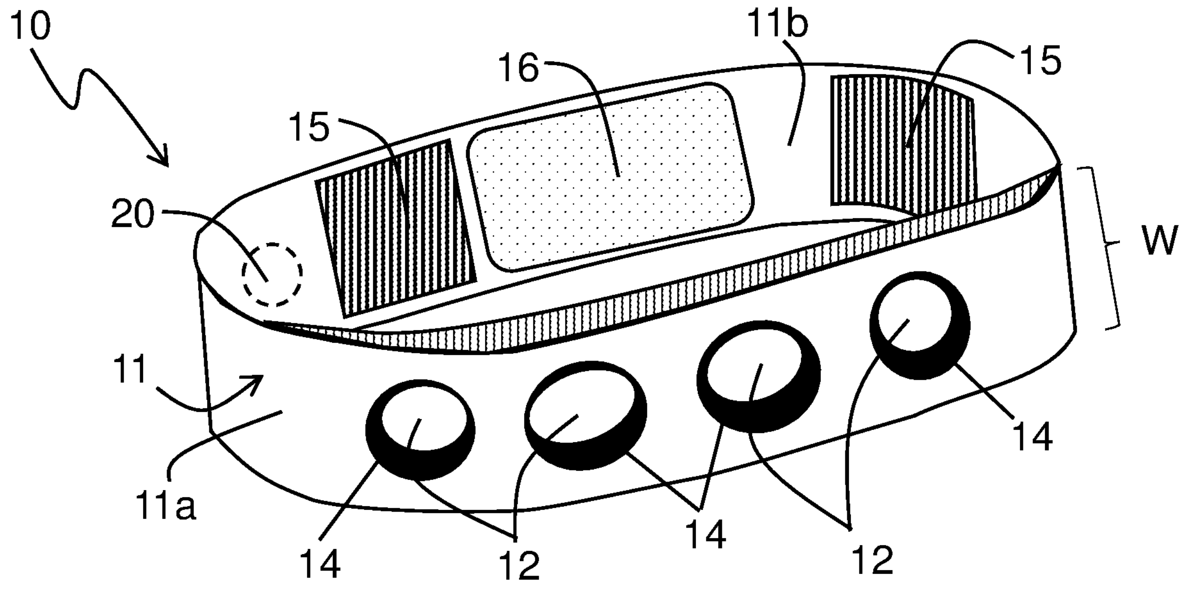
— FIG. 2 —
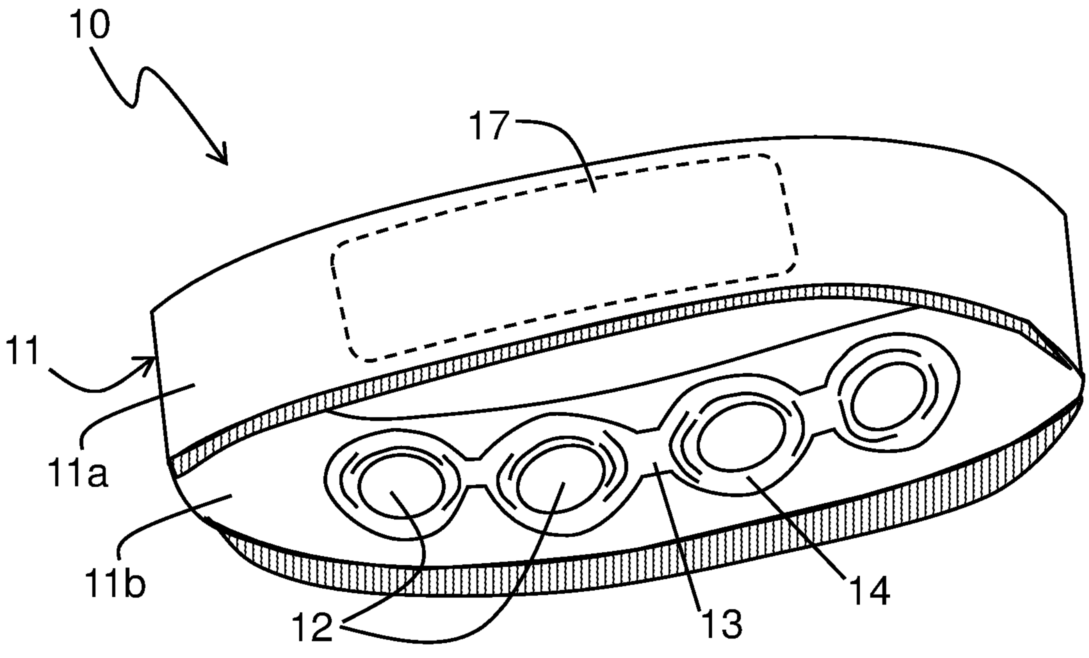
— FIG. 3 —

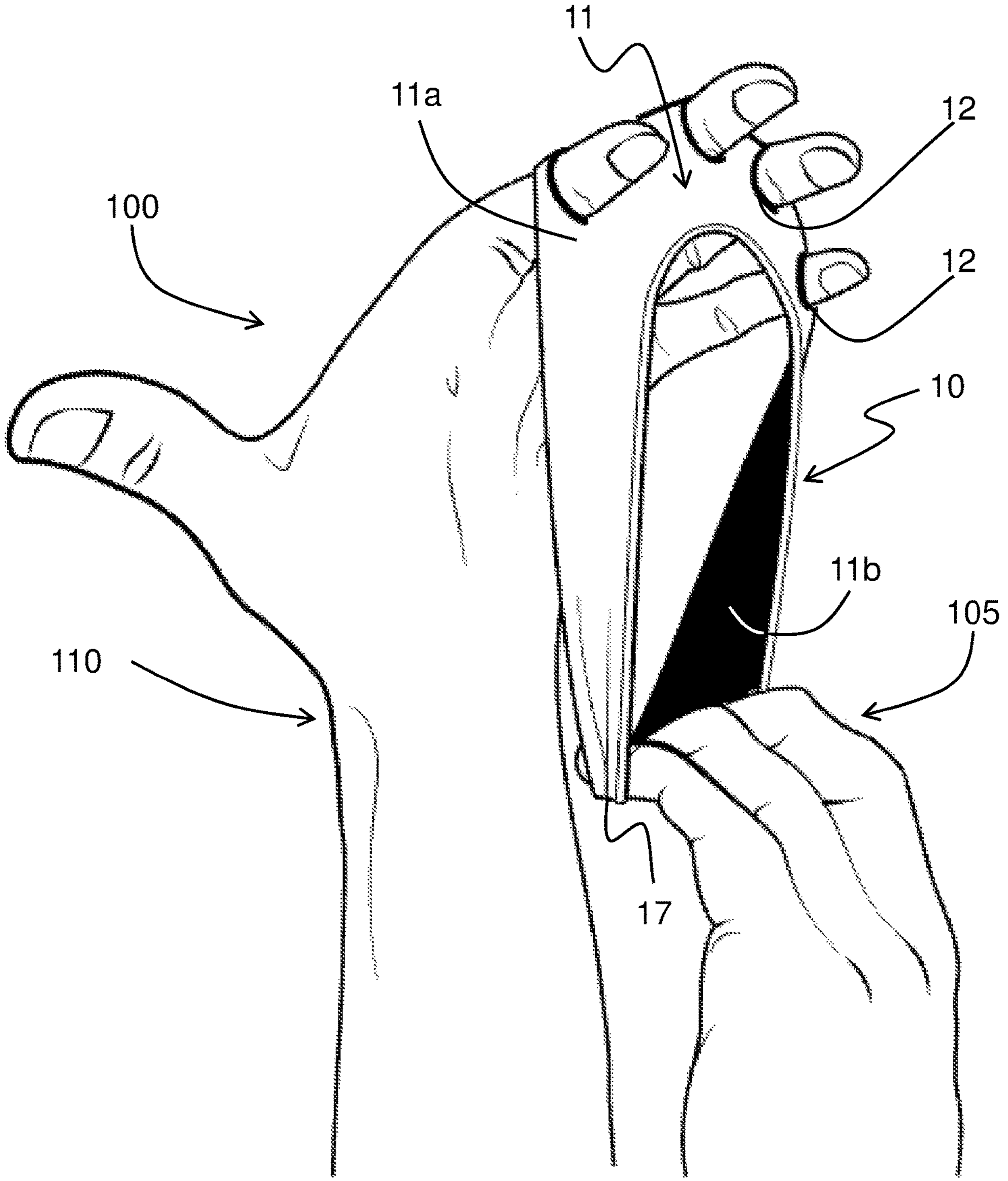
— FIG. 4 —

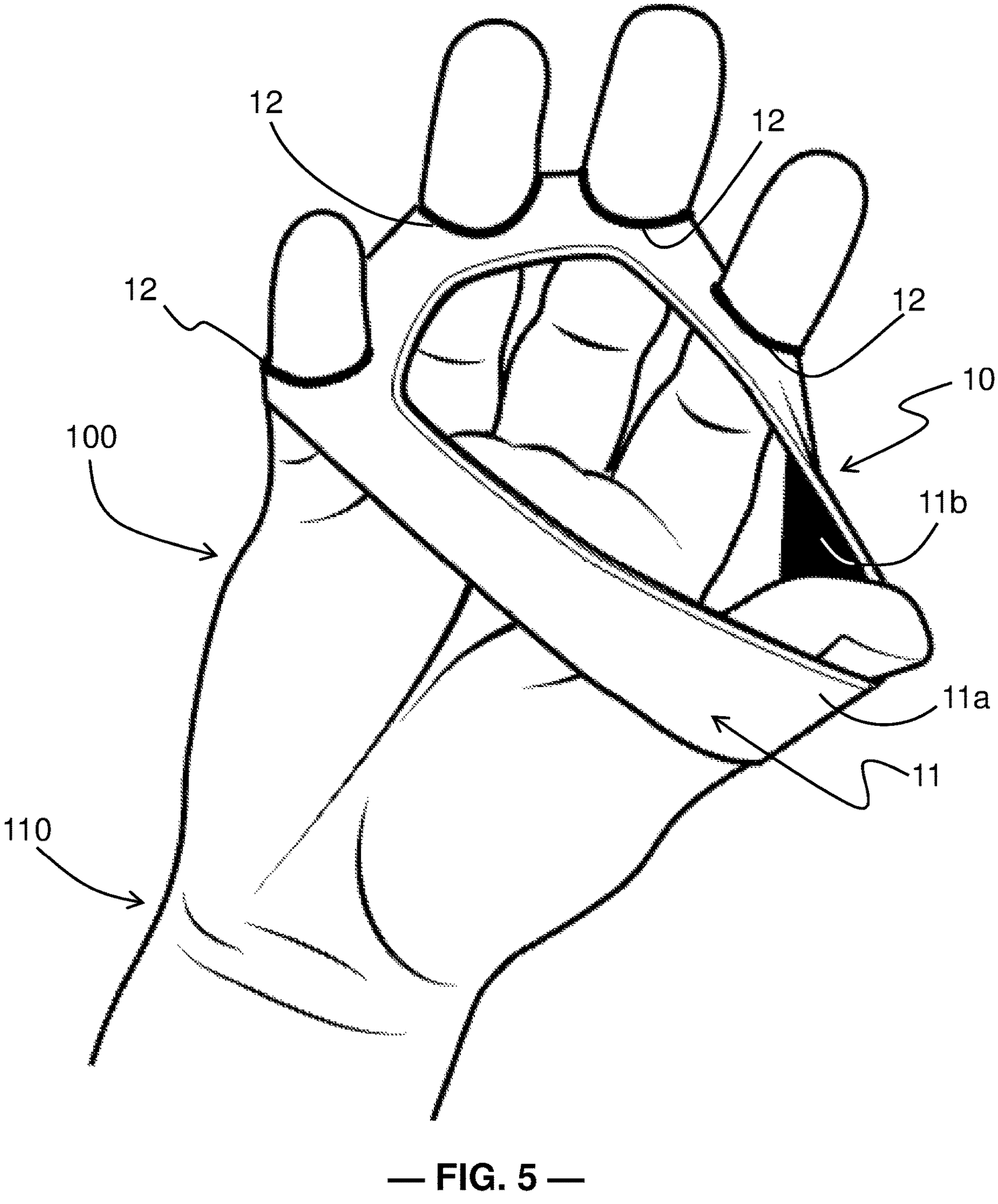
— FIG. 5 —

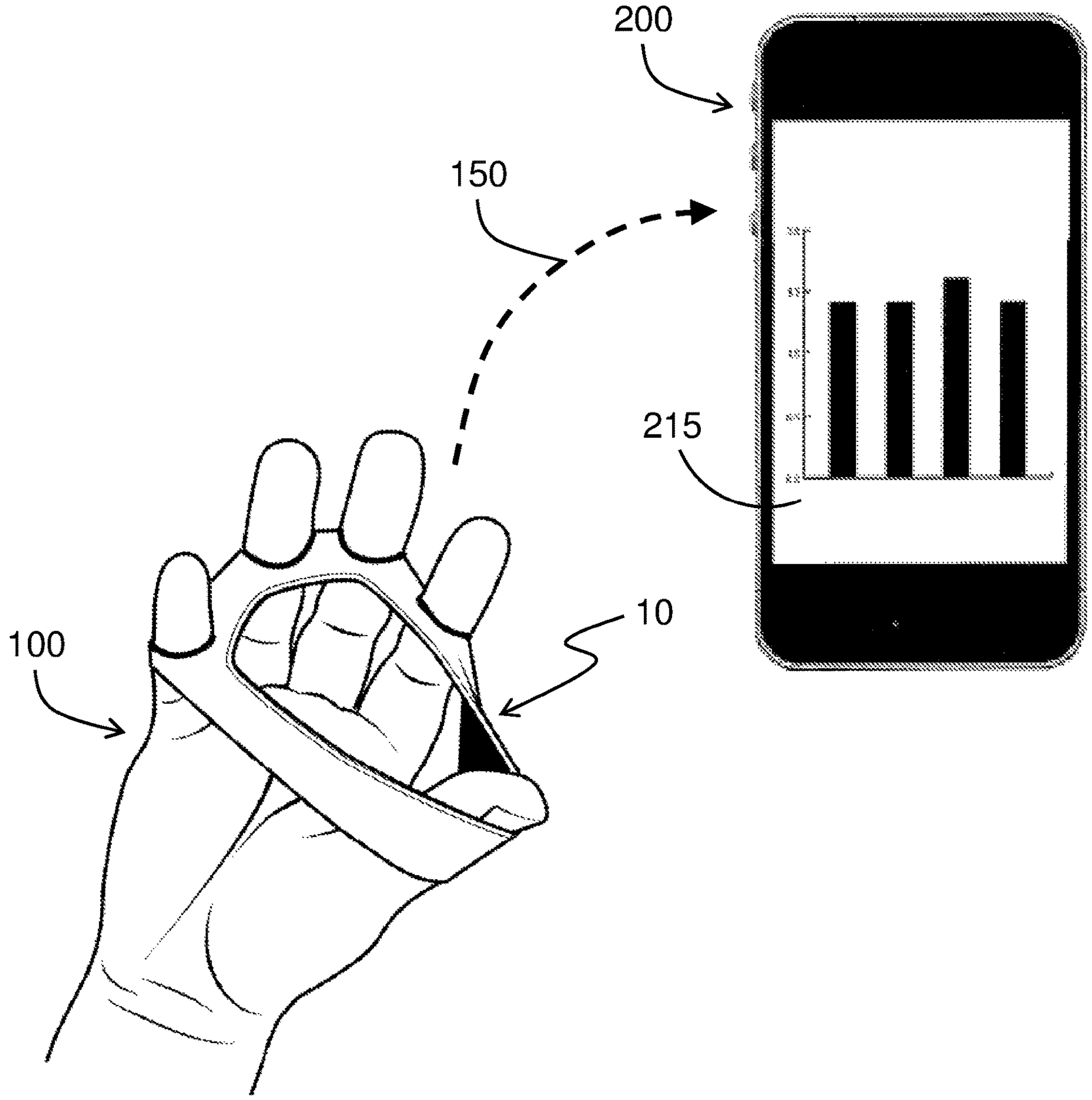
— FIG. 6 —

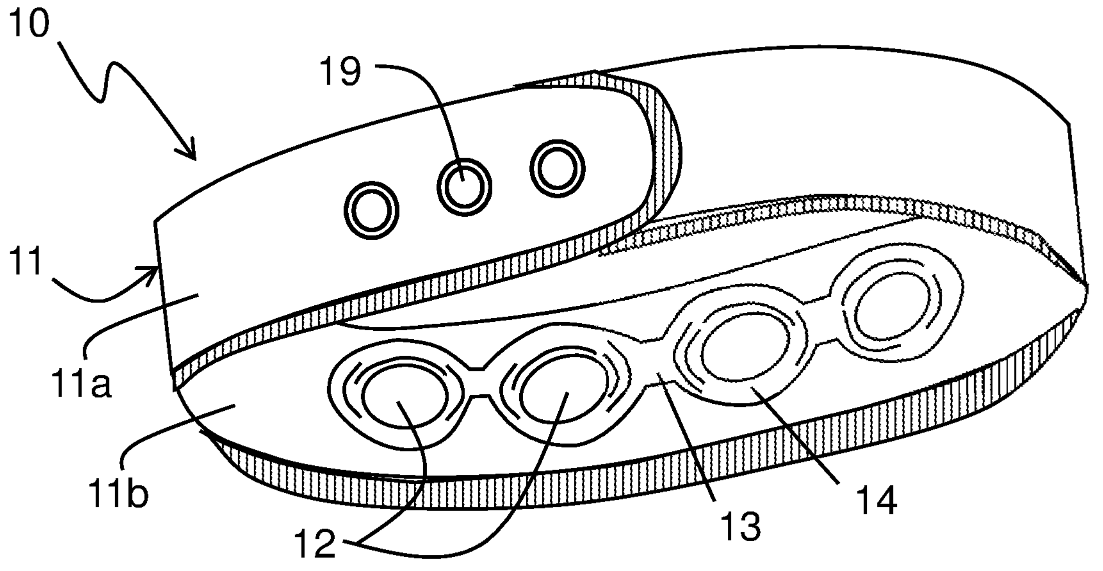
— FIG. 7 —
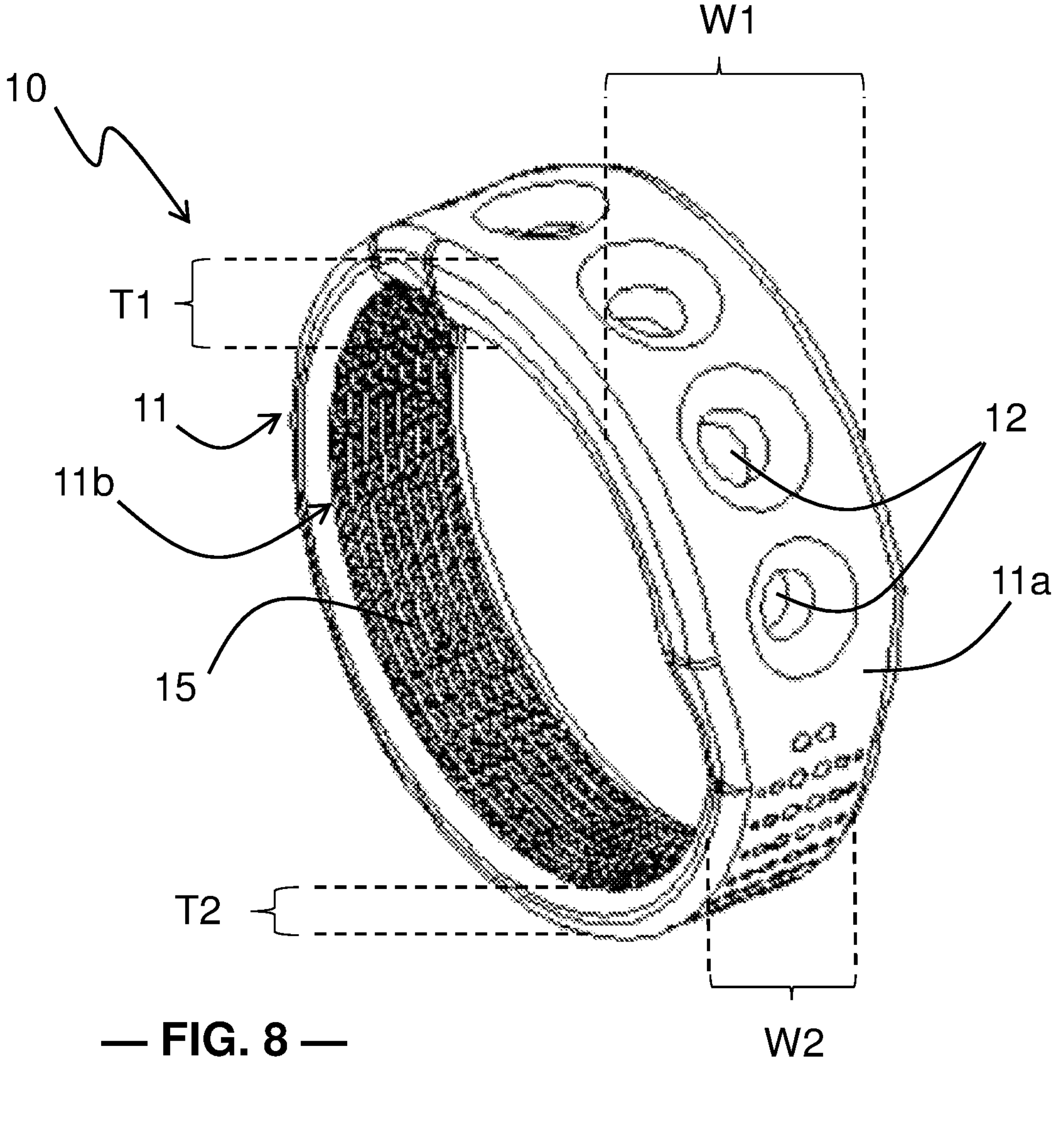
— FIG. 8 —

METHOD FOR EXERCISING HAND, WRIST, AND FOREARM USING STRETCHABLE THERAPEUTIC BRACELET

CROSS-REFERENCE TO RELATED APPLICATIONS

This application is a divisional application of U.S. application Ser. No. 16/507,014, filed Jul. 9, 2019, and issued on May 31, 2022, as U.S. Pat. No. 11,344,768, which claims priority to U.S. Provisional Application No. 62/695,582, filed on Jul. 9, 2018, the entire disclosures of which are hereby incorporated by reference.

TECHNICAL FIELD

The present disclosure relates to the field of exercise equipment and, more particularly, to a therapeutic, elastomeric wrist-worn band ("bracelet") that is configured to permit stretching and strengthening of the hand, wrist, and forearm; for supporting and cushioning the wrist in an ergonomically correct position; and for massaging tender or injured muscles.

BACKGROUND

People who routinely use one or both hands for repetitive tasks may experience physical stress caused by improper wrist posture and repetitive motions. Improper ergonomics and overuse of the hands, wrists, and forearms in occupational settings (e.g., typing or using a tool), in professional sports, during recreational activities (e.g., playing an instrument or gardening), or while using handheld electronic devices (e.g., texting on a cellular phone) may contribute to discomfort and pain.

Such activities over-utilize one group of muscles and adjacent soft tissue, while under-utilizing another group of muscles and adjacent soft tissue. These activities create an imbalance with the risk of permanently impairing the natural function of the hand, leading to painful conditions that are classified as upper extremity musculoskeletal disorders. These disorders—such as carpal tunnel syndrome, De Quervain's tenosynovitis, tendinitis of the wrist, tennis elbow, and other conditions—may involve muscles, bone, joint, peripheral nerves, vasculature, tendons, and adjacent soft tissue. Multiple medical, occupational, governmental, and scientific organizations have studied the prevalence of these types of disorders; the financial, psychological, and mental impact of these types of disorders on the affected individuals; the societal impact of these disorders (e.g., in terms of lost productivity); and potential approaches for minimizing or remediating the stresses caused by repetitive motions and poor ergonomics.

Remediation may involve rest, icing, compression, splinting, kinesiotaping, elevation, physical therapy, surgery, and use of exercise devices. Exercise devices can be used as a reparative and/or post-surgical therapy means. However, exercises devices can also be used as a preventative therapy to strengthen muscles and to reduce stress.

Many existing exercise devices focus on the strengthening of the muscles and adjacent soft tissues of the hand, wrist, and forearm, rather than on stretching the muscles and adjacent soft tissues. In particular, existing devices commonly neglect the stretching of the flexor muscles of the hand and forearm.

U.S. Pat. Nos. 3,612,521 and 6,179,751 each describe closed bracelet systems that fit around the fingers and thumb of a user's hand. These bracelets are not designed to stretch the flexor muscles and cannot be worn or secured around the wrist for portability. These bracelets do not include electronic sensors for monitoring and encouraging progress.

U.S. Pat. No. 6,224,513 describes a "therapeutic hand exerciser" ball that increases blood flow to the affected areas of the hand and forearm. The ball tightens the flexor muscles of the forearm but neglects to strengthen the weak extensors. The exerciser ball has no features that promote exercise adherence.

U.S. Pat. No. 8,343,015 describes a finger exerciser to exercise each finger individually by depressing directly against the resistance of a spring. The device strengthens only the flexor muscles of the hand and fingers, while failing to address the extensor muscles. The mechanical device is not convenient to transport and includes no features that promote exercise adherence. The electronic sensors of the exerciser do not provide data on pertinent metric of the overall hand, wrist, and forearm exercises.

U.S. Pat. No. 9,005,084 describes a finger exercise to exercise each finger individually by depressing directly against the resistance of a spring. This device strengthens the flexor muscles of the hand, while neglecting to strengthen or to stretch the extensor muscles. The mechanical device is not conveniently transported and offers nothing to promote consistent use.

U.S. Patent Application Publication No. 2002-0065172 describes an exercise device designed to facilitate the exercising and concomitant strengthening of the wrist, hand, and fingers, while engaged in the activity for which the exercise is directed. The device focuses on strengthening the muscles of the wrist, hand, and forearm, while neglecting to stretch the flexor muscles. The device is not designed to be worn around the wrist, thus increasing the potential for misplacement.

It is well understood that the success of preventing, alleviating, and recovering from repetitive strain disorders depends on a balanced and consistent routine of exercise and therapeutic activities. None of the above exemplary devices are configured to provide support for the wrist when the bracelet is not in use for stretching or strengthening exercises; or to provide massaging capabilities for tender or injured muscles. The above exemplary devices are not configured to promote their routine use, which is necessary to achieve the desired preventative or remedial effect. For example, these and other devices are not configured to be worn by the user in their daily activities.

Additionally, the above exemplary devices do not show instructional markings for proper use. Existing devices do not include textual and/or graphic markings to encourage adherence or include sensors to gather performance metrics for display on an electronic device (such as the user's cellular phone, tablet computer, or personal computer), which allows the user to monitor his progress over time.

It would be useful to provide a single device that is configured for strengthening and for stretching both the flexor and extensor muscles of the fingers, wrist, and forearm; that supports the wrist to reduce tension; that can be used for massaging or kneading sore or tender muscles; that includes instructional markings and/or textual markings to promote use; and, optionally, that includes sensors to allow the user to track his progress.

SUMMARY

The present therapeutic bracelet provides multiple exercise capabilities in a single device, such exercises including (a) stretching of the flexor muscles and adjacent soft tissue; and (b) strengthening of the extensor muscles and adjacent soft tissue. The device provides a more balanced exercise regimen to improve functionality of the target muscle groups and to prevent impairment of the natural use of the hand, the wrist, and the forearm.

The device also may be used to massage sore or tender muscles as well as cushioning or supporting the wrist when the bracelet is not being used for stretching and strengthening the muscles of the fingers, wrist, or forearm.

The therapeutic bracelet can be worn on the user's wrist at all times, thereby increasing accessibility and serving as a visual reminder for the user to perform the exercises. The bracelet may include impression marking(s) for specified holding sites to reinforce proper exercise posture and/or textual or graphic marking(s) to encourage use and exercise adherence. The bracelet may optionally include one or more electronic sensors that transmit wireless signals to a computing application installed on a hand-held device (such as a user's cellular phone) to monitor performance and to provide reminders to encourage consistent use.

Specifically, the present disclosure is directed to a therapeutic bracelet, which includes a strip of elastomeric material that defines an interior surface, an exterior surface, and a plurality of finger holes extending through the strip. The strip of elastomeric material is configured to be positioned over an operative hand of a user and to be worn around a wrist of the user. Upon periodic removal of the therapeutic bracelet from the wrist, the user inserts one or more digits in the finger holes from the interior surface and stretches the therapeutic bracelet with a thumb of the operative hand or with an opposite hand.

A method of using the therapeutic bracelet to alternately strengthen and stretch the operative hand is also provided. The method includes: positioning one or more fingers of an operative hand into a corresponding number of finger holes defined through a strip of elastomeric material defining the therapeutic bracelet, via an interior surface of the strip of the elastomeric material; positioning the strip of elastomeric material over a dorsal surface of the operative hand; grasping the strip of elastomeric material with an opposite hand at a location opposite the number of finger holes; and stretching the strip of elastomeric material away from the one or more digits to stretch the one or more digits of the operative hand.

Another method for using a therapeutic bracelet is provided. The elastomeric bracelet has a first surface comprising a plurality of raised protrusions and a second surface opposite the first surface. The method includes: orienting the therapeutic bracelet on a wrist of a user, such that the second surface is in contact with the wrist; and moving the wrist in a kneading motion against the skin of sore or injured muscles, whereby the protrusions promote myofascial release.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 1 is a perspective view of a therapeutic bracelet of the present disclosure, as worn around a user's wrist;

FIG. 2 is a perspective view of the therapeutic bracelet of FIG. 1, which shows the exterior surface containing a plurality of finger holes;

FIG. 3 is a perspective view of the therapeutic bracelet of FIGS. 1 and 2, which shows the interior surface containing the plurality of finger holes;

FIG. 4 is a perspective view of the therapeutic bracelet of FIG. 1, which is being used to perform a stretching exercise;

FIG. 5 is a perspective view of the therapeutic bracelet of FIG. 1, which is being used to perform a strengthening exercise;

FIG. 6 is a perspective view of the therapeutic bracelet of FIG. 1, which may include a sensor to communicate wirelessly with a handheld electronic device, such as a cellular telephone;

FIG. 7 is a perspective view of a therapeutic bracelet with one or more releasable fasteners, according to another aspect provided herein;

FIG. 8 is a perspective view of a therapeutic bracelet with varying width and thickness and with a continuous array of protrusions on an interior surface thereof.

DETAILED DESCRIPTION

Figure 9:
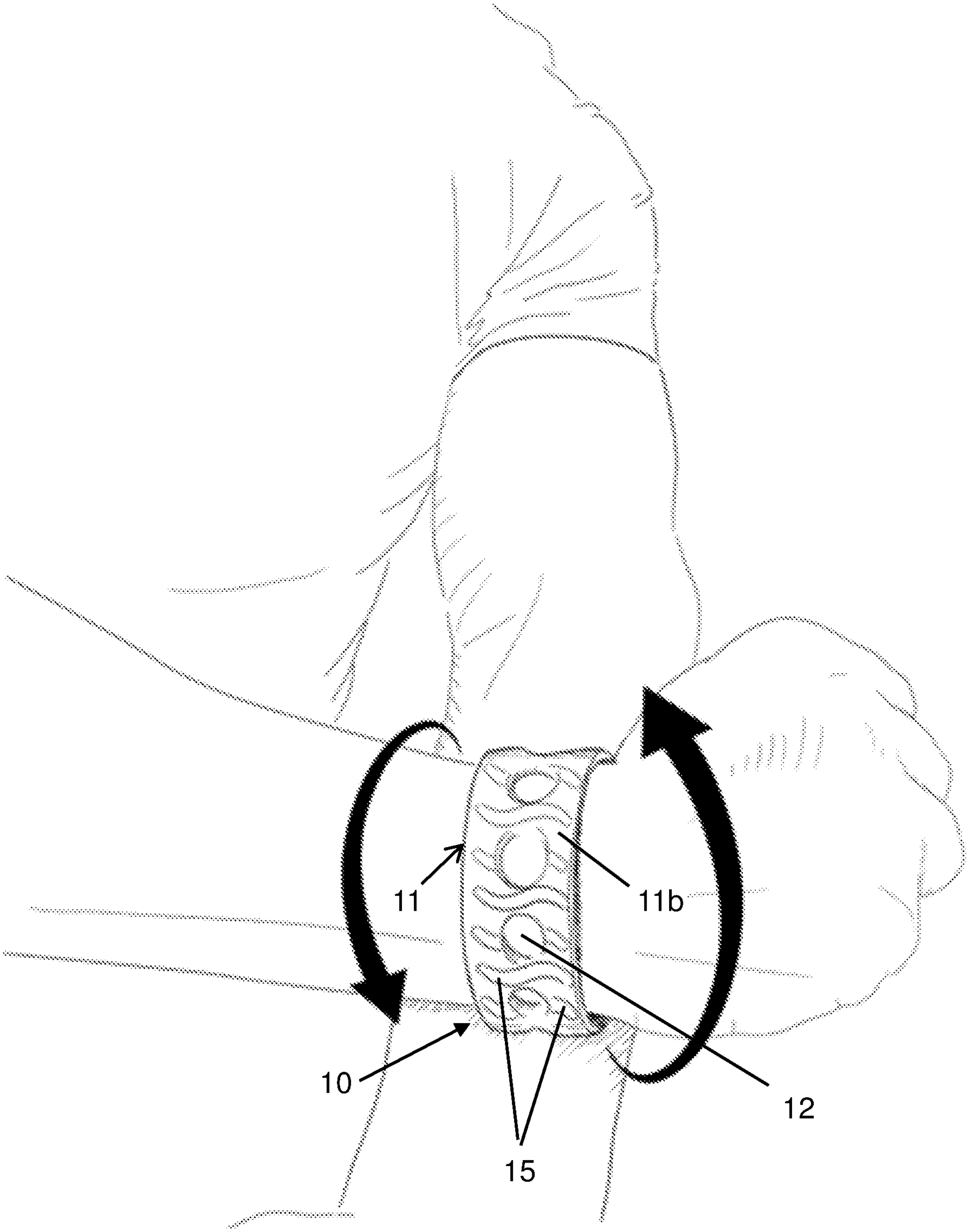
FIG. 9 is a perspective view of the therapeutic bracelet of FIG. 8, in which the therapeutic bracelet is turned inside out in a massaging orientation for rubbing protrusions of the continuous array of protrusions against an area of skin of the user.

Reference will now be made in detail to the presently preferred embodiments of the multi-function therapeutic bracelet, one or more examples of which are illustrated in the figures. Each example is provided by way of explanation and is not meant to be a limitation of the claimed subject matter. For example, features illustrated or described as part of one embodiment may be used with a different embodiment to yield yet still another embodiment. It is intended that the present application include such modifications and variations as come within the scope and spirit of the present disclosure. Selected combinations or aspects of the disclosed technology correspond to a plurality of different embodiments of the present alert notification system. Certain features may be interchanged with similar devices or different features not expressly mentioned that perform the same or similar functions.

As used herein, the singular forms of "a," "and," and "the" include plural versions, unless the context clearly dictates otherwise.

The present therapeutic bracelet is a closed (or closeable) band of an elastomeric material (e.g., silicone, urethane, polymers, or the like) that has a resting circumferential length and a specific level of resistance and resilience to stretching. The bracelet is configured to be worn on the user's wrist (as shown in FIG. 1) and to be stretched when placed on the user's wrist, removed from the user's wrist, and during exercises. Following stretching, the bracelet returns to its resting circumferential length.

The bracelet defines several (e.g., three, four, five, or more) openings therethrough, within which the user may insert his fingers, as shown in FIGS. 4 and 5. At least four of the finger holes are positioned within one half of the circumferential length of the bracelet. Each finger insertion hole is designed for insertion of one or more digits (fingers, thumb) through the designated holes, via the interior surface of the bracelet. The position of the finger holes is spaced for optimal finger placement to achieve a specific line of pull for each exercise and to ensure that the fingers are disposed in a safe, comfortable, and correct manner for each specified exercise. The finger holes allow for alternate resistance levels based on the respective positions of the fingers within the finger holes (i.e., proximal, mid, or distal). The finger holes may be reinforced with additional material for strength.

The bracelet is pliable, flexible, durable, hypoallergenic, water-resistant, and capable of being fully submerged. Thus, there is no impediment in the construction of the bracelet to prevent the user from wearing it consistently or at least during waking hours. The inner surface of the bracelet is designed with impression markings (protrusions and/or concavities) to cradle the user's wrist when the bracelet is not being used for stretching and strengthening exercises. The protrusions may also be employed as a massage device, when the bracelet is inverted (i.e., turned inside out). The exterior surface of the bracelet includes areas for various functional and/or aesthetic markings, including labeling, texturing, and/or coloring for decorative, marketing, or instructional use. The labeling may include graphical or textual elements. Space between the finger holes and on the exterior surface of the finger holes may or may not be reinforced to provide consistent and optimal stretching and strengthening functions.

Optionally, the present therapeutic bracelet may include electronic components, such as sensors, microcontrollers, and/or transceivers. The optional electronic components are embedded within the bracelet to capture and monitor sensory data from the user's actions, including, but not limited to, stretch capacity, resistance levels, and positional markers of the bracelet; and spatial, vibrational, heat, and biological markers in the hand, wrist, and forearm. The data can be communicated wirelessly to and from an integrated controller to a remote device, such as a user's cell phone or a personal computer (as shown in FIG. 6).

FIG. 1 illustrates a therapeutic bracelet 10 that slips over a user's hand 100 and circumferentially surrounds a user's wrist 110. The therapeutic bracelet 10 is formed from a strip 11 of elastomeric material, such as silicone, urethane, or other polymers, which is resilient to stretching. The strip 11 defines a circumferential length. In the embodiment illustrated in FIGS. 1 through 3, the strip 11 defines a uniform width W around the circumference of the bracelet 10. In the exemplary embodiment, four finger holes 12 are defined through the strip 11 of elastomeric material. The finger holes 12 are spaced around a circumferential portion of the strip 11 that is less than the entire circumference (e.g., around approximately half of the circumferential length). The bracelet 10 may be worn on either wrist, depending on user preference.

As shown in FIGS. 2 and 3, the elastomeric strip 11 that defines the therapeutic bracelet 10 includes an exterior surface 11*a* and an interior surface 11*b*. The finger holes 12 extend through the strip 11 from the exterior surface 11*a* to the interior surface 11*b*. The finger holes 12 may be reinforced with additional reinforcement material 14. Additional reinforcement material may be applied to the spaces 13 between the holes 12 on the interior surface 11*b*. In some embodiments, the portion of the elastomeric strip 11 that defines the finger holes 12 has a greater thickness than the remaining portion of the elastomeric strip 11.

The interior surface 11*b* may include raised protrusions 15, which can provide a cushioning and/or massaging effect to the user's wrist, depending on the shape of the protrusions 15. The protrusions 15 may be linear, as shown, or may be some other shape including semi-spherical, frustoconical, or curvilinear. The protrusions 15 may be disposed in one or more localized areas of the interior surface 11*b* (as shown in FIG. 2) or may be disposed across a continuous large area of the interior surface 11*b* (as shown in FIG. 8).

As shown in FIG. 9, the bracelet 10 can be turned inside out, so that the protrusions 15 on interior surface 11*b* are facing the user. In this orientation, the user is able to use the bracelet 10 as a massage device. Specifically, the user wearing the bracelet 10 around one wrist can rub the bracelet 10 against the skin (for example, of the opposite forearm), thereby contacting the skin with the protrusions 15 to break up adhesions between the skin and the muscle in tender or injured areas (i.e., causing myofascial release). In addition to their possible therapeutic benefit, the location of the raised protrusions 15 may also assist users in positioning their thumb within the bracelet 10 for strengthening exercises (as shown in FIG. 5).

The interior surface 11*b* may optionally include an area 16 for labeling, which may include textual or graphical elements for instructing use or for marketing or manufacturing information. The colors of such elements contrast with the color of the bracelet 10.

Optionally, various electrical components 20 for monitoring the use of the bracelet 10 may be embedded within the bracelet 10, as will be described further herein.

In the illustrated embodiment, the exterior surface 17 opposite the finger holes 12 defines a large surface suitable for textual or graphical elements that may be used for marketing, for prescribing use recommendations, for encouraging exercise adherence, or for any other purpose.

FIGS. 4 and 5 illustrate exemplary manners of using the bracelet 10 for stretching and strengthening an operative hand 100. The term "operative hand" is not limited literally to only the hand and fingers of the hand being exercised. It should be appreciated that exercises described herein result in the strengthening and/or stretching of the flexor muscles of the fingers, wrist, and forearm.

Further, it should be understood that the bracelet 10 may be used for other purposes, such as the stretching of individual digits (fingers or thumb) in series or in parallel; the cushioning of the user's wrist, via areas of increased thickness, when the user is performing repetitive tasks, such as typing; and the massaging or kneading of affected areas with the protrusions 15 when the bracelet 10 is oriented with the protrusions facing outward. The user, experimenting alone or working with a physical therapist or doctor, may devise other manners of using the bracelet 10.

FIG. 4 illustrates an exemplary use of the therapeutic bracelet 10 for stretching (i.e., elongating) the flexor muscles to reduce tension on the wrist joint, the nerves, and the blood vessels of an operative hand 100 (e.g., a user's right hand). The user removes the bracelet 10 from his wrist 110 and orients the bracelet 10 in a relaxed state with the fingertips of the operative hand being positioned in the finger holes 12 (via the interior surface 11*b*), the palm of the hand facing downward (i.e., over the dorsal surface of the hand), and the area 17 opposite the finger holes 12 being positioned toward the user.

To begin the stretching exercises, the user grasps the area 17 with his opposite hand 105 (e.g., his left hand) and pulls the bracelet 10 in the direction of the antecubital fossa (elbow pit) of the operative hand 100. This action bends the head of the metacarpals and the wrist of the operative hand 100 in a backward direction (i.e., toward the elbow pit), thereby stretching the flexor muscles and soft tissues of the operative hand 100. The tension and resistance experienced by the user can be increased by positioning the fingers further into the finger holes 12 of the bracelet 10.

After stretching the flexor muscles for a prescribed time, the user releases the tension on the bracelet 10 by moving the opposite hand 105 toward the operative hand 100, and the flexor muscles and soft tissue of the operative hand 100 are returned to a relaxed state. For increased benefit, the stretching exercise may be repeated for a prescribed number of cycles with intervening periods of rest.

The user may insert all four fingers of the operative hand 100 into the corresponding finger holes 12, or may elect to insert fewer than four fingers into the finger holes 12. For example, the user may stretch one, two, or three fingers at a time. Also, the bracelet 10 can be used for stretching the thumb of the operative hand 100. Thus, the bracelet 10 may be used to stretch all the digits (fingers and thumb) of the operative hand.

The exercises may be repeated for the opposite hand 105 (e.g., the left hand), since the bracelet 10 is configured for use by either hand. The user may opt to perform a series of exercises with a first hand 100 only before switching the bracelet 10 to a second hand 105. Alternately, the user may elect to have a staggered sequence of exercises, switching between the first hand 100 and the second hand 105.

FIG. 5 illustrates another exemplary use of the bracelet 10 for strengthening the operative hand 100 (e.g., the right hand). With the bracelet 10 in a relaxed state, the user inserts his fingers through the interior of the bracelet 10 and positions his fingers into the finger holes 12 on the interior surface 11*b* with his palm facing upward. The finger holes 12 can accommodate positioning the proximal, mid, or distal phalanges of each of the four digits within the finger holes 12 to adjust the resistance the user experiences.

To begin strengthening exercises, the dorsal (back) surface of the thumb of the operative hand 100 is placed securely on the interior surface 11*b* of the bracelet 10 (e.g., on the raised protrusions 15) spaced apart from the finger holes 12. The user extends all five fingers of the operative hand 100 collectively away from each other with the bracelet 10 creating tension and resistance, thereby concentrically contracting the extensor muscles and adjacent soft tissue. The five fingers are then eccentrically contracted, reducing the resistance of the bracelet 10 and returning the operative hand 100 to a relaxed state.

This exercise, which may be repeated for a prescribed cycle with intermittent periods of rest, fortifies the extensor muscles by promoting collagen production. By strengthening the extensor muscles in this sequence, the tension of the flexor muscles is further reduced.

Completing the exercises described with reference to FIGS. 4 and 5 promotes unimpeded blood flow and nerve conduction through the hands, wrists, and forearms. Consistent exercise restores muscle balance (e.g., between flexors and extensors), reduces pressure on the nerves and blood vessels affected by repetitive motion stresses, and alleviates symptoms of painful conditions caused by repetitive motion stresses. As a result, the user experiences less pain, greater finger dexterity, and improved functions of the hands, wrists, and forearms.

Once the user has completed his exercises with one hand, he may exercise the other hand. When the user has finished all the desired sets of exercises, he may reposition the bracelet 10 on his wrist 100 or set aside for later use. It is contemplated that the user will be more likely to remember to periodically perform the stretching and strengthening exercises described herein because he is wearing the exercise device (i.e., the bracelet 10) around his wrist. Accordingly, it is readily available for quick use during lulls or breaks in his work day; during the commute to or from work by bus, train, or car (e.g., if another is driving or if stuck in traffic); or during recreation times (such as while watching television).

To monitor and track exercise cycles, the bracelet 10 may optionally be provided with electronic components, collectively labeled as element 20 in FIG. 2. The electronic components 20 may include sensors (e.g., position sensors, vibration sensors), wireless transceivers (e.g., Bluetooth® beacons), microprocessors, a power supply (e.g., a battery), and the like, which are used to detect the motion of the bracelet 10 and to transmit signals 150 representative of the detected motions to a remote computing device 200, as shown in FIG. 6. The remote computing device 200 may be a user's cellular phone (as shown), a tablet computer, a laptop computer, or a smart watch on which a customized application 215 is installed for processing the signals 150. The application may produce graphical depictions and/or textual messages of performance metrics related to the number of repetitions, the duration of the exercise cycles, the resistance created by the bracelet 10, and the like. The application may also be configured to provide reminders at a prescribed time interval to promote usage of the bracelet 10.

FIG. 7 illustrates an alternative configuration of the present therapeutic bracelet 10, in which the elastomeric strip 11 is discontinuous and includes one or more releasable fasteners 19 to define the bracelet 10. The releasable fasteners 19 may be selected from the group consisting of metallic or plastic snap closures, magnetic closures, hook-and-loop fabric (e.g., VELCRO®) closures, or the like. The releasable fasteners 19 may be used to secure the bracelet 10 around the user's wrist and may allow the user to adjust the circumference of the bracelet 10 to better fit the user's wrist.

FIG. 8 illustrates a bracelet 10 having an interior surface 11*b* provided with a continuous series of protrusions 15. As described above, the bracelet 10 may be turned inside out, so that the protrusions 15 are facing the user. While wearing the bracelet 10 in this orientation, the user may rub the protrusions 15 against the skin of a tender or injured area (for example, of the opposite forearm) to act as a massaging device that reduces adhesions between the skin and the muscles in the tender or injured area (i.e., causing myofascial release).

FIG. 8 further illustrates an exemplary configuration of the bracelet 10 in which the area in which the finger holes 12 are defined has a first width W1 and a first thickness T1. In at least one embodiment, the remainder of the strip 11 of elastomeric material has a second width W2, which is less than the first width W1. In at least one embodiment, the remainder of the strip 11 of elastomeric material has a second thickness T2, which is less than the first thickness T1. Alternately, the bracelet 10 may have a uniform width W (as shown in FIG. 1) or a uniform thickness (e.g., T1), which are selected to balance user comfort with desired elasticity. The thickness of the bracelet 10 provides cushioning, support, and/or stabilization of the wrist to perform repetitive functions (e.g., for typing or keyboarding) at more ergonomically correct angles.

An exemplary method of producing the therapeutic bracelet 10 includes creating a block mold in the shape of the elastomeric strip (either continuous or discontinuous) with an optional inset for the electronic components; and injecting an elastomeric material (e.g., silicone, urethane, or other pliable polymer) into the block mold in an injection molding process. Once the mold has been filled, the mold is cooled until the elastomeric strip is cooled sufficiently to permit removal. During the cooling process, ports may be embedded in the cast elastomeric strip through which dyes may be injected to form images, letters, and insignia along the exterior surface of the bracelet 10. Alternately, any desired patterns or distinguishing characters may be incorporated into the mold.

While preferred embodiments of the present multi-function therapeutic bracelet have been shown and described, modifications and variations may be made thereto without departing from the spirit and scope of the present disclosure. Thus, it should be understood that various embodiments may be interchanged, both in whole or in part. Furthermore, those with skill in this technology will appreciate that the foregoing description is by way of example only and is not intended to be a limitation of the invention as further described in the appended claims.

What is claimed is:

1. A method of using a therapeutic bracelet, the method comprising:

positioning one or more digits of an operative hand of a user into a corresponding number of finger holes defined through a strip of elastomeric material defining the therapeutic bracelet, via an interior surface of the strip of elastomeric material, wherein the strip of elastomeric material defines a continuous circumference to be worn around a wrist of the user;

positioning the strip of elastomeric material over a dorsal surface of the operative hand; and stretching the strip of elastomeric material in a first motion by grasping, with an opposite hand of the user, the strip of elastomeric material at a location along the strip of elastomeric material opposite the corresponding number of finger holes, orienting the operative hand with the palm facing downward, and pulling the therapeutic bracelet in a direction toward the antecubital fossa of an arm to which the operative hand is connected.

2. The method of claim 1, wherein the strip of elastomeric material comprises silicone, urethane, or one or more polymers resilient to stretching.

3. The method of claim 2, wherein the corresponding number of finger holes comprises four finger holes, the four finger holes being spaced to accommodate the one or more digits of the operative hand of the user.

4. The method of claim 3, wherein the four finger holes are defined within one half of the continuous circumference of the therapeutic bracelet.

5. The method of claim 3, wherein the four finger holes are reinforced with additional elastomeric material.

6. The method of claim 2, wherein the strip of elastomeric material has a first thickness in a first portion of the strip of elastomeric material in which the corresponding number of finger holes is provided and a second thickness in a remaining portion of the strip of elastomeric material, wherein the first thickness is greater than the second thickness.

7. The method of claim 2, wherein the strip of elastomeric material has a first width in a first portion of the strip of elastomeric material in which the corresponding number of finger holes is provided and a second width in a remaining portion of the strip of elastomeric material, wherein the first width is greater than the second width.

8. The method of claim 1, wherein the stretching of the strip of elastomeric material occurs over a series of repetitions.

9. The method of claim 8, further comprising tracking the series of repetitions via one or more electronic components disposed within the strip of elastomeric material.

10. The method of claim 9, further comprising transmitting signals representative of detected motions of the one or more digits of the operative hand to a remote computing device.

11. The method of claim 9, further comprising tracking a number of repetitions in the series of repetitions, a duration of an exercise cycle of the series of repetitions, and resistance created by the therapeutic bracelet.

12. The method of claim 1, further comprising wearing the therapeutic bracelet around the wrist of the user and periodically removing the therapeutic bracelet from the wrist of the user before positioning the one or more digits of the operative hand of the user into the corresponding number of finger holes; and wherein the corresponding number of finger holes defined through the strip of elastomeric material are unfilled when the therapeutic bracelet is worn.

13. The method of claim 1, wherein the stretching of the strip of elastomeric material comprises a second motion by grasping the strip of elastomeric material with one or more digits of the opposite hand at a location along the strip of elastomeric material opposite the number of finger holes or inserting a thumb of the operative hand into the interior surface of the strip of elastomeric material, orienting the operative hand with the palm facing upward, and extending the one or more digits of the operative hand away from each other to create tension in the therapeutic bracelet, thereby exercising the operative hand.

14. The method of claim 1, further comprising increasing resistance of the therapeutic bracelet against the operative hand by positioning the one or more digits of the operative hand into the corresponding number of finger holes at a depth greater than an initial depth at which the one or more digits of the operative hand are positioned in the corresponding number of finger holes.

15. The method of claim 1, further comprising, after pulling the therapeutic bracelet in a direction toward the antecubital fossa of the arm to which the operative hand is connected, releasing tension on the therapeutic bracelet by moving the opposite hand toward the operative hand.

16. The method of claim 1, wherein the stretching of the strip of elastomeric material comprises orienting the operative hand with the palm facing upward, inserting the thumb of the operative hand into the interior surface spaced apart from the corresponding number of finger holes, and extending the one or more digits of the operative hand away from each other, thereby concentrically contracting one or more extensor muscles and adjacent soft tissue of the operative hand.

17. A method of using a therapeutic bracelet, the method comprising:

positioning one or more digits of an operative hand of a user into a corresponding one or more of four finger holes defined through a strip of elastomeric material defining the therapeutic bracelet, via an interior surface of the strip of elastomeric material, wherein the strip of elastomeric material defines a continuous circumference to be worn around a wrist of the user and wherein the four finger holes are spaced to accommodate the one or more digits of the operative hand of the user;

positioning the strip of elastomeric material over a dorsal surface of the operative hand; and grasping the strip of elastomeric material with one or more digits of the opposite hand at a location along the strip of elastomeric material opposite the number of finger holes or inserting a thumb of the operative hand into the interior surface of the strip of elastomeric material, orienting the operative hand with the palm facing upward, and extending the one or more digits of the operative hand away from each other to create tension in the therapeutic bracelet, thereby exercising the operative hand;

wherein the interior surface of the strip of elastomeric material is provided with a plurality of protrusions spaced circumferentially apart from the four finger holes and projecting from the interior surface of the strip of elastomeric material.

18. The method of claim 17, further comprising disposing the therapeutic bracelet around the wrist and rubbing the plurality of protrusions against an area of skin of the user to cause myofascial release in the area of the rubbed skin.

19. The method of claim 17, further comprising turning the therapeutic bracelet inside out and positioning over an operative wrist in a massaging orientation; and, while the therapeutic bracelet is in the massaging orientation, rubbing the plurality of protrusions against an area of skin of the user to cause myofascial release in the area of the rubbed skin.

* * * * *